MODIFIED CROSS-CORRELATION RADIO SYSTEM AND METHOD

Filed Aug. 4, 1951 2 Sheets-Sheet 1

INVENTORS
MEYER LEIFER
DESMOND W. CAWOOD
HUNTER C. HARRIS JR.
BY Paul S. Martin
ATTORNEY INVENTORS
MEYER LEIFER
DESMOND W. CAWOOD
HUNTER C. HARRIS JR.
BY Paul S. Martin
ATTORNEY 2,941,202

MODIFIED CROSS-CORRELATION RADIO SYSTEM AND METHOD

Hunter C. Harris, Jr., Roslyn Heights, Meyer Leifer, Jackson Heights, and Desmond W. Cawood, Brooklyn, N.Y., assignors, by mesne assignments, to Sylvania Electric Products Inc., Wilmington, Del., a corporation of Delaware Filed Aug. 4, 1951, Ser. No. 240,414

11 Claims. (Cl. 343—101)

The present invention relates to methods and apparatus useful in navigation systems, including, for example, radio navigation systems and radars, in contrast to ordinary communication systems such as those for transmission of voice, telegraphy and television.

In co-pending application, Serial No. 142,483, filed by Norman L. Harvey, now Patent No. 2,690,558, the cross-correlation principle of radio navigation systems is discussed. In the Harvy application, a signal of one form and type of modulation is sent over a transmission path and in a receiver a signal of identical modulation characteristics is compared with the transmitted signal as to waveform and timing, and this is done (before demodulation is effected) by heterodyning or multiplying the signals together and integrating the product term produced in the heterodyning operation. The integration is advantageously accomplished at carrier level by virtue of a frequency difference between the carrier of the transmitted signal and the carrier of the locally produced signal, and this is effected by a narrow band-pass filter.

The cross-correlation system described in the above identified co-pending application involves the comparison of signals that are alike in waveform and phase or timing. The effectiveness of the discrimination of such a system against interference of all kinds and especially against multipath transmissions depends to a large extent on a wide spectrum. Wide-band transmission is rarely practical and accordingly the usefulness of a system in which virtually identical signals are cross-correlated is restricted. An object of the present invention is to extend the advantages of discrimination that characterize the foregoing cross-correlation system to navigation systems despite a requirement of a narrower transmission spectrum.

In the illustrative embodiments of the present invention, the modulation form used is a rectangular pulse. Such modulation inherently requires a broad frequency spectrum for transmission as a modulated carrier, whether of the frequency modulated type or the amplitude modulated type. As is well known, the spectrum, of a carrier modulated by a rectangular pulse can be reduced, by passing the signal through a band-pass filter. If such a reduced-spectrum pulse were compared (per the Harvey disclosure) with an identical pulse of restricted bandwith in the receiver, the discrimination against multipath signals would be of a relatively low order.

This may be more fully understood from the following:

The performance of a cross-correlation system may be described in a manner very similar to the description accorded electronic pulse systems. The latter is usually explained in the complementary pictures of time and frequency, i.e. any function of time, say a pulse, has associated with it a spectrum or band of sinusoidal waves. A useful interpretation of the spectrum is that it is a specification of dimension, that is, an arrangement of $n$ spectrum lines are the necessary $n$ dimensions of the accompanying time function. An important property of relating the frequency and time picture is the phenomenon of reciprocal spreading. If the time picture, e.g. the pulse, becomes narrower, the spectrum becomes broader. Mathematically, this phenomenon is that of a Fourier transform pair, one member being the time picture, and the other the frequency picture.

In cross-correlation systems, when the product is taken of two signals of the same periodicity, each having a broad spectrum, the integral of such product will vary in dependence on the relative spectral distributions of the signals, and on their relative timing or phase. The variation of the integral as a function of the identifying characteristic signals to be correlated is termed the cross-correlation function.

The correlation function possesses the same relationship to the product of the local and received spectrum that was previously outlined as being characteristic of the time and spectrum of a pulse signal. In other words, the shape of the correlation function is the Fourier transform of the product spectrum. Due to this relationship the reciprocal spreading phenomenon is a characteristic of the cross-correlation system, i.e., as the correlation function becomes narrower the product spectrum becomes broader.

The usual requirement of cross-correlation navigational systems is that the correlation function should exhibit a pronounced maximum or a steep slope, generally characterized as sharp in distribution, in contrast to any subsidiary peaks or changes occuring within the whole range being evaluated. Whatever the required cross-correlation function of such system, we have found that this can be realized even when the spectrum of the transmitted signal is limited, by complemental enlargement of the local signal spectrum used in the cross correlation process.

We have found that, since the cross-correlation function distribution is related to the product spectrum, the locally generated and the received spectral distributions may be altered differently to meet certain environmental requirements as long as their product is that required to produce the specified cross-correlation function.

As an example of the usefulness of this concept, consider the typical transmitting system which is restricted by the limited bandwidth of a practical antenna. Such a restriction permits very little flexibility in the choice of the transmitted signal, and hence of the received spectrum. However, due to the product spectrum relationship of cross-correlation systems it is possible to alter the local spectrum in such a way that the desired product spectrum and hence the desired correlation function is obtained. It is to be noted that this procedure results in some loss in efficiency in the cross-correlation process, the most efficient case being that in which the local and received spectra have identical distributions (disregarding noise and other interference in the received signal). However, to attain equivalent performance in the correlation system using the modified local signal, it is only necessary to increase the transmitter power.

It is apparent from the foregoing that the merits of the cross-correlation system such as that in the Harvey application (where signals of like spectra are cross-correlated) can be realized by properly related local and received signals of different spectral distributions. With slight loss of signal-energy efficiency, equal discrimination against all kinds of interference, including multi-path transmissions, can be realized. Moreover, with the present modified cross-correlation system, a relative gain is attained. The transmission band width is reduced and, partly because of this, it is actually possible to obtain superior discrimination against certain forms of jamming.

It has been stated above that the desirable type of correlation function for sharp discrimination is one that exhibits a pronounced maximum in contrast to any subsidiary peaks that may occur in the range being evaluated.

A typical but important case is one in which the signal spectrum product has a $$\left(\frac{\sin X}{X}\right)^2$$

amplitude distribution, extending infinitely in both directions from the carrier along the frequency coordinate. The cross-correlation function (amplitude as a function of relative timing of the signals being correlated) rises along a straight sloping line to a peak and reversely falls along a straight line of equivalent opposite slope. This is a special case of Wiener's Theorem which states that the cross-correlation function is the Fourier transform of the cross-power spectrum of the two signals.

Consider the case in which a transmitter spectrum is limited so as, for filtered pulse signals, to be of the form $$\left(\frac{\sin X}{X}\right)$$

If this signal were to correlate with a like signal, in modulation form and of varied relative timing, the cross product is:

$$\left(\frac{\sin X}{X}\right)^2$$

and the cross correlation function is a triangle (considering the horizontal axis as its base).

If the local spectrum of the signal that is to be correlated with the filtered pulse signal that is transmitted is of a substantially broader spectrum, a much sharper cross-correlation function is realized. Thus, if the local signal is of effectively uniform spectral distribution, the cross-correlation function is the Fourier transform of $$\left(\frac{\sin X}{X}\right)\cdot K$$

(where K is a constant representing-a-uniform-amplitude spectrum) or a rectangle, whose base is one half that of the triangle, and whose controlling characteristic, the leading edge, for example, is vastly more critical than the leading slant side of the triangle. The nature of the invention and further novel features thereof will be more fully understood from the following description of two embodiments shown in the accompanying drawings, wherein.

Figure 1:
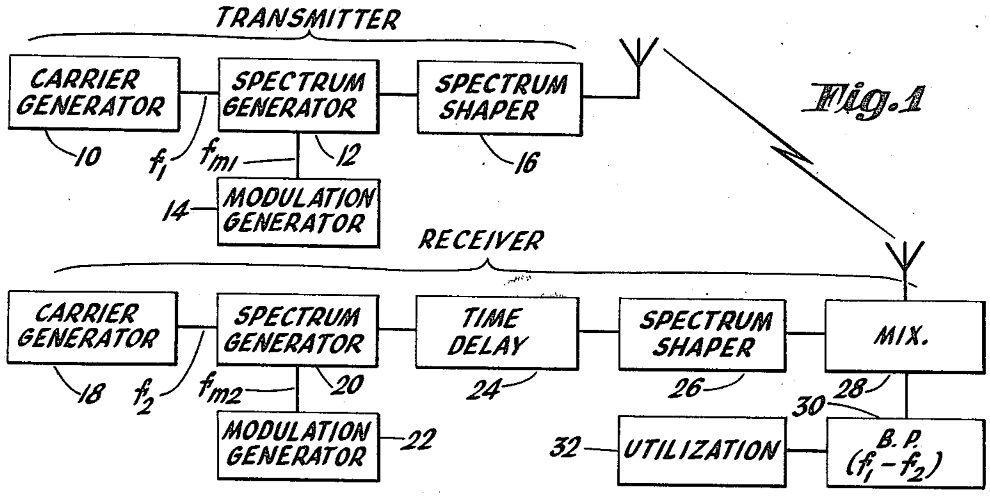
Figure 1 is the block diagram of an embodiment of the invention useful as a part of the "loran" navigation system.

Referring now to Figure 1, a carrier generator 10 is provided, ordinarily a continuous wave radio frequency generator. Its signal $f_1$ is mixed in modulator or spectrum generator 12 of the amplitude-modulating or frequency modulating or other type with a signal $f_{m1}$ from modulation generator 14, advantageously of the type to provide rectangular pulses of regular but brief duration and of regular periodicity or pulse repetition rate. In broad contemplation, $f_{m1}$ may be any signal such as a sine wave, provided that a modulated spectrum of useful width is produced by generator 12. This is modified in spectrum shaper 16 for transmission over an open link where it is exposed to commingling with various types of interference including noise and multipath reflections before reaching the cross-correlation receiver.

In the event that a magnetron or like modulated signal generator is employed, the carrier generator and the spectrum generator are actually one and the same device, needing only the additional spectrum shaper; and this too can be embodied in the same device by appropriate design.

The cross-correlation receiver similarly includes means 18, for generating a carrier and means 20, for generating a modulation spectrum, preferably a pulse signal, under control of modulation generator 22. This signal is delayed in element 24 and its spectrum is shaped in element 26; and the shaped spectrum is then combined with the transmitted signal in heterodyning mixer 28. The designer may incorporate portions 18 and 20 in a single device as in the transmitter (but of low power) and such device may incorporate appropriate delay and spectrum shaping networks shown separately. The time delay unit can be omitted in favor of a phaser controlling the modulator generator; and this can be manual, or it can be automatic in the manner of the aforementioned copending application of N. L. Harvey. Generators 14 and 22 may be of like design; or modulator 22 can be of a design to assist in producing the desired broad spectrum and thus simplify or avoid the spectrum shaper. The carrier frequency $f_2$ produced by generator 18 is advantageously different from carrier frequency $f_1$ and accordingly, a frequency difference $f_{i.f.}$ equal $(f_1-f_2)$ is available at the output of mixer 28. This is filtered in narrow band-pass filter 30 whose output is impressed on utilization device 32. The signal $f_{m2}$ of generator 22 is advantageously a rectangular pulse of the same or shorter pulse duration as that of generator 14 but of the same pulse repetition rate; or it may, in broad concept, be any signal of the same periodicity as $f_{m1}$.

Figure 2A:
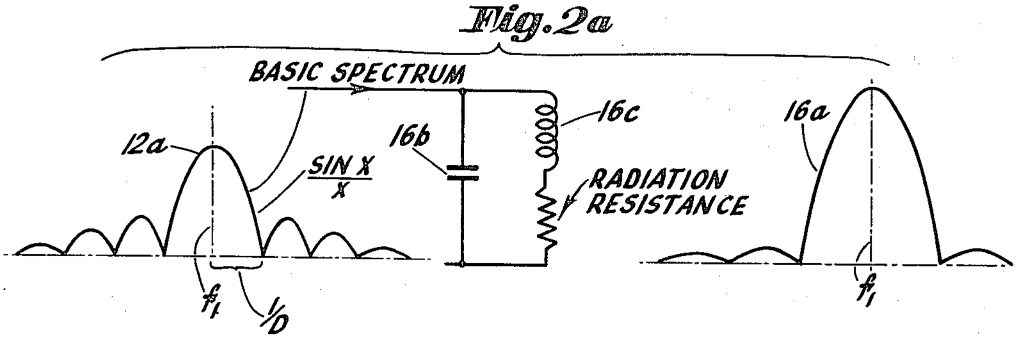
Figures 2A and 2B represent respectively, the signal spectrum at different parts of the transmitter and of the receiver of Figure 1.

In Figure 2A, a typical pulse modulated spectrum at the output of spectrum generator 12 is represented by curve 12*a*, and the spectrum after modification in spectrum shaper 16 as further modified in the transmission path is represented by curve 16*a* at the right of Figure 2A. The spectrum 12*a* is modified in a relatively sharp resonant circuit, diagrammatically illustrated as including capacitor 16*b* and inductor 16*c*, whose sharpness is modified somewhat by the radiation resistance of the antenna. The spectrum width that is transmitted is seen to be substantially narrower than that produced directly by modulating carrier $f_1$. This meets with the practical desired condition that the transmission spectrum should be restricted, yet as will be seen, the advantages of cross-correlation can still be realized.

Figure 2B:
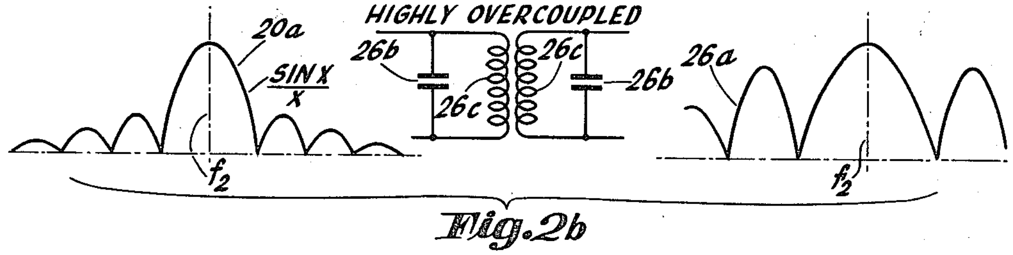

The spectrum produced by spectrum generator 20 is represented by curve 20*a* in Figure 2B, and this is shaped to accentuate the side band components relative to the center band components, so as to result in a spectrum distribution 26*a* at the output of spectrum shaper 26. This shaper can, for example, take the form of an over-coupled pair of high-Q resonant circuits, including capacitors 26*b* and inductors 26*c*, where these inductors are closely coupled as stated. Where microwave frequencies are involved, it will be apparent to those skilled in the art that waveguide or transmission line analogues of devices 26*b*—26*c* are to be used.

Figure 2C:
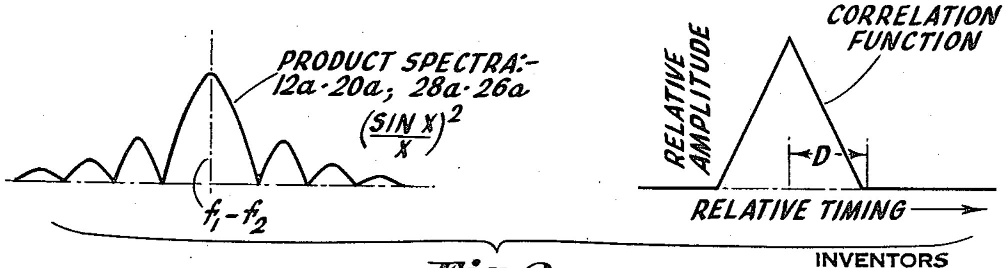
Figure 2C represents the product spectrum and the integral thereof as a function of relative timing, that is, the cross-correlation function of the transmitted and received signals.

Spectra 16*a* and 26*a* are heterodyned in mixer 28. When two such signals are heterodyned, a "product spectrum" is in one sense obtained, but is different for each different relative phase of the signals. However, in this specification the term product spectrum is used to convey a different connotation. If the individual carrier and sideband components of one signal are multipled respectively by the carrier and the corresponding sideband components of the other signal, a "product spectrum" is obtained. This does not exist physically, but is a useful concept that is helpful toward appreciation of the invention. The Fourier transform of this product spectrum is the cross-correlation function represented at the right in Figure 2C and this is realized at the output of filter 30 as the relative timing of the local signal is varied relative to the received signal. The response is shown in Figure 2C at the right as a function of the relative timing or phase of the periodic signals being cross-correlated. Filter 30 is sharply tuned to a single spectrum constituent as $f_1-f_2$. Integration can be effected by separating out and then combining certain other discrete spectrum frequencies. Where the filter selects the center-band constituents, its pass-band is less than twice the pulse repetition frequency, or less than twice the modulation frequency in the general case. Excessive narrow banding is not desirable because it retards search speed. Such filter functions as an integrator for the product produced by the mixer, which multiplies the spectra to be correlated. The sharpness of the correlation function in Figure 2C is the desired result achieved despite the limitation on the side-band energy spread in the transmitted signal. The symbol D in Figure 2C is the relative delay related to the spectrum portion $1/D$ in Figure 2A.

Figure 3:
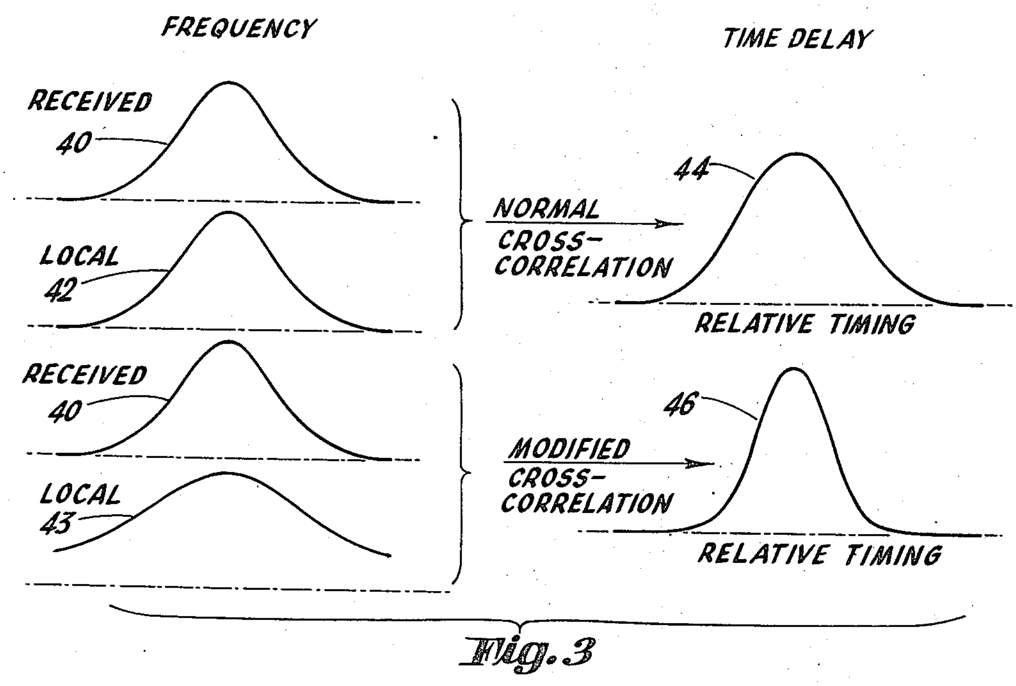
Figure 3 shows illustrative frequency spectra and the related cross-correlation functions of "normal" cross-correlation, and of " modified" cross-correlation.

The concept may be more effectively demonstrated by a comparison of "normal" cross-correlation with the new "modified" cross-correlation exemplified above. The cross-correlation of "like" signals as transmitted and received, represented by curves 40 and 42 in Figure 3, results in a broad cross-correlation function 44 in Figure 3. The same transmitted spectrum 40, heterodyned with the broader spectrum 43 of the same periodicity, yields the relatively sharp cross-correlation function 46 in Figure 3. This improved sharpness of the maximum and narrowness of the base are characteristics of the cross-correlation function that improve discrimination of the system against multipath transmissions.

Delay unit 24 is made adjustable so as to bring into time coincidence the two signals to be cross-correlated; and when this is achieved manually, with the aid of a simple rectifier and meter as utilization device 32 at the output of the multiplier 28 and integrator 30, the correlation is critically established despite the presence of multipath transmissions. The "modified" cross-correlation, while less efficient in the presence of random noise than "normal" cross-correlation, is nevertheless excellent in performance in the presence of such high noise levels as would obscure the signal entirely were it conventionally detected (demodulated and displayed on an oscilloscope without benefit of cross-correlation). This arrangement will be recognized as one link in a loran system normally having two geographically spaced transmitters and two receivers located at the same point; and such whole system is manifestly within the purview of this invention.

The cross-correlation of signals of equal periodicity and narrow transmitted spectrum with a broad locally generated spectrum, where the transmitter and receiver are located at separated points, is applicable in principle to a radar in which the transmitter and the receiver are located at the same point; with the difference that in the radar it is readily possible to utilize only one carrier generator and modulation generator. In both cases the cross-correlation receiver includes the combination of a signal spectrum multiplier and a product integrator.

Figure 4:
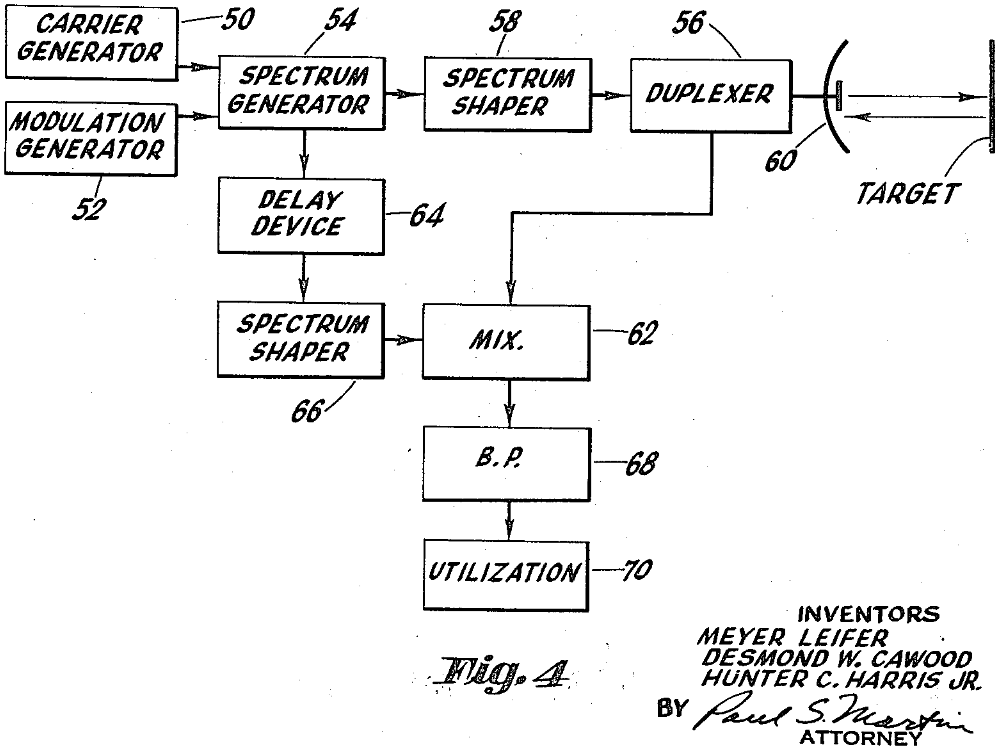
Figure 4 is the block diagram of a radio echo ranging and direction finding device or radar embodying features of the invention.

In Figure 4, a radar is shown including a carrier generator 50 and a modulation generator 52 to produce a modulated carrier in modulator or spectrum generator 54, a rectangular pulse modulated carrier in this illustration. This is coupled through duplexer 56 and spectrum shaper 58 to a transmitting and receiving antenna 60. As is known, the signal is transmitted to a reflecting target and the echo is then received after a time delay that depends on the distance of the target from the radar by the same antenna 60 for reverse transmission through duplexer 56, and to mixer 62.

The spectrum provided by generator 54 is passed through a delay device 64 and through spectrum shaper 66 to this same mixer 62. The carrier frequency of the signals from units 66 and 56 is the same and accordingly, the cross-product available from mixer 62 is a video signal; and this is integrated in a narrow low-pass filter in this instance, and to utilization device 70.

In broad principle, the operation of this illustrative embodiment of the invention is no different from that of Figure 1; its operation would be more completely the duplicate of Figure 1 if a fixed-frequency local oscillator and a mixer were used to shift the frequency applied by spectrum shaper 66 and to mixer 62, the local and carrier oscillations being related by a fixed frequency change.

Spectrum shaper 58 is a narrow band-pass high-Q filter for limiting the transmission spectrum, whereas, spectrum shaper 66 is a broadly tuned network having the characteristic of accentuating the side band components relative to center frequency components of the impressed spectrum, just as in the case of Figures 2A and 2B, respectively. These filters are illustrative only, being susceptible to varied forms of circuit implementation in practice. The signals as generated have been described as rectangular pulse modulated carriers, modified to achieve a narrow but substantial spectrum from the transmitter and a broader spectrum in the correlation portion of the receiver. It is entirely feasible to employ different forms of pulses (but of the same repetition rate) in the transmitting and in the receiving portions of the system and thus to incorporate the effects of the separate spectrum shaper shown.

The foregoing embodiments of the invention demonstrate how, with limited transmission bandwidth, it is possible to achieve excellent discrimination against various sky-ways or other multipath transmissions with a degree of excellence comparable to the cross-correlation system in which like signals are compared, by employing with the cross-correlation receiver a broad-band spectrum generator. The broad spectrum and correlation of signals of "like" modulation characteristics is superior in discriminating against random noise; but this difference can be overcome by moderate increase in transmitter power, in a system employing narrow and broad spectra.

Various additional modifications in matters of detail incorporating the foregoing features of the invention will be apparent to those skilled in the art, as will be varied applications of those novel features; and it is accordingly appropriate that the appended claims be accorded that broad latitude of interpretation that is consistent with the spirit and scope of the invention.

What is claimed is:

1. A method of navigation including the steps of transmitting, over a transmission path exposed to interference including both noise and multipath transmissions, a comparatively narrow spectrum including a carrier and side bands representing a periodic signal, providing in a receiver a local signal of the same periodicity but with a broader spectrum than said narrow spectrum, heterodyning the transmitted spectrum as received against the local signal, and integrating the product obtained from the heterodyning operation.

2. The method of navigation, including the steps of transmitting a first periodic signal of comparatively narrow spectrum, generating locally a second periodic signal of the same periodicity as the first signal but of broader spectral distribution, heterodyning the two signals together to yield a product, and integrating the heterodyne product over a period of time at least equal to the period of said signals, whereby a correlation function will be obtained in dependence on the relative timing of said signals.

3. In a method of navigation in which a first locally produced signal is correlated with a second similar signal received from a transmission path terminating at the place where the first signal is produced, and in which said signals are heterodyned to produce a heterodyne product and the heterodyne product is integrated to yield a cross-correlation function that represents the variable phase relation of the two signals, the steps of shaping the transmitted signal to restrict its spectrum band-width, and shaping the locally produced signal to enlarge its band-width in that manner that yields a heterodyne product whose spectrum is the Fourier transform of a correlation function having a sharp maximum and no substantial subsidiary maxima.

4. The method of discriminating against multipath transmitted signals of certain modulation periodicity reaching a receiving station wherein the spectrum of the transmitted signal is of limited spectral range, which includes the steps of locally providing a signal at the receiving station of the same periodicity but of greater frequency spectrum, multiplying the received and the locally provided signals together, and integrating the product over a period at least equal to the modulation period.

5. The method of discriminating against multipath transmitted signals of certain modulation periodicity reaching a receiving station wherein the spectrum of the transmitted signal is of limited spectral range, which includes the steps of locally providing a signal at the receiving station of the same periodicity but of greater frequency spectrum, multiplying the received and the locally provided signals together, integrating the product over a period at least equal to the modulation period and adjusting the modulation timing of said signals to yield the maximum integral.

6. In radio navigation, the method of claim 4, which further includes the steps of providing a common signal to control both modulated carriers in common.

7. A radio navigation system including a transmitter having means for generating a modulated carrier of a certain periodicity and of a certain limited band width, a receiver, means in the receiver for providing a local modulated carrier of the same periodicity and of broader band width, a multiplier connected to multiply said transmitted and local spectra together, and an integrator energized by the multiplier to integrate the product over a time interval at least equal to the modulation period.

8. A radio navigation system including means for generating and transmitting a periodically modulated carrier of limited band width, a broad-band spectrum generator, and a cross-correlation receiver having input means for receiving signals from said limited bandwidth transmitting means, said receiver including a narrow-band filter whose characteristic rejects frequencies outside twice the modulation frequency, a heterodyne device connected in energizing relation to said narrow-band filter, and signal connections from both said input means and said broad-band spectrum generator to said heterodyne device.

9. A radio navigation system in accordance with claim 8, wherein both generators include a common modulation source and separate spectrum generators.

10. A radio navigation system in accordance with claim 8, wherein the carrier frequencies are different and said filter is of the band-pass type.

11. A radio navigation system in accordance with claim 8, wherein the carrier frequencies are alike and said filter is of the low-pass type.

References Cited in the file of this patent

UNITED STATES PATENTS

Re. 23,440 Earp ---------------- Dec. 18, 1951